US00RE46182E

(19) United States
(12) Reissued Patent
Weber et al.

(10) Patent Number: US RE46,182 E
(45) Date of Reissued Patent: Oct. 25, 2016

(54) FILTER DEVICE FOR FILTRATION OF GASEOUS FLUIDS

(71) Applicant: MANN+HUMMEL GMBH, Ludwigsburg (DE)

(72) Inventors: Andreas Weber, Freiberg a. N. (DE); Timo Dirnberger, Marbach am Neckar (DE)

(73) Assignee: MANN+HUMMEL GMBH, Ludwigsburg (DE)

(21) Appl. No.: 14/528,542

(22) Filed: Oct. 30, 2014

Related U.S. Patent Documents

Reissue of:
(64) Patent No.: 8,298,310
Issued: Oct. 30, 2012
Appl. No.: 12/706,010
Filed: Feb. 16, 2010

(30) Foreign Application Priority Data

Feb. 16, 2009 (DE) ..... 20 2009 002 178 U

(51) Int. Cl.
*B01D 46/00* (2006.01)
*B01D 46/10* (2006.01)
*B01D 46/42* (2006.01)

(52) U.S. Cl.
CPC ..... *B01D 46/0004* (2013.01); *B01D 46/10* (2013.01); *B01D 46/4236* (2013.01)

(58) Field of Classification Search
CPC ..... B01D 46/523; B01D 46/521; B01D 2271/072; B01D 2271/027; B01D 46/0004; B01D 46/10; B01D 46/4236
USPC ..... 55/484, 491, 501, 502, 495, 503
See application file for complete search history.

(56) References Cited

U.S. PATENT DOCUMENTS 3,881,250 A * 5/1975 Frederickson ..... 30/383
3,950,157 A * 4/1976 Matney ..... 55/490
4,498,989 A * 2/1985 Miyakawa et al. ..... 210/450
5,391,212 A * 2/1995 Ernst et al. ..... 55/385.3

FOREIGN PATENT DOCUMENTS

DE 19859854 6/2000
WO WO 00/38821 * 7/2000
WO WO 0038821 A1 * 7/2000

OTHER PUBLICATIONS

EP Search Report Eo 10 15 3673.

* cited by examiner

*Primary Examiner* — Elizabeth McKane
(74) *Attorney, Agent, or Firm* — James Hasselbeck

(57) ABSTRACT

A filter device for filtration of gaseous fluids has a multi-part housing with a first housing part and a second housing part connected to one another in a mounted state of the multi-part housing. A filter element is insertable into the multi-part housing. A connecting device penetrates the filter element and provides a connection between the first and second housing parts. The connecting device has at least one first housing projection monolithically formed on the first housing part. The connecting device further has a damping element arranged between the at least one first housing projection and the second housing part.

22 Claims, 2 Drawing Sheets

FILTER DEVICE FOR FILTRATION OF GASEOUS FLUIDS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

Priority is claimed based on Federal Republic of Germany patent application no. DE 20 2009 002 178.5 filed Feb. 16, 2009, the entire contents of which are incorporated by reference.

BACKGROUND OF THE INVENTION

The invention concerns a filter device for filtration of gaseous fluids, in particular an air filter in motor vehicles, comprising a filter element insertable into a multi-part housing wherein at least two housing parts of the multi-part housing are connected to one another in the mounted state.

DE 196 38 790 A1 discloses an intake air filter for an internal combustion engine comprised of a filter element embodied as an insertion part and arranged in a filter housing. The filter housing has a basic housing member and a removable cover that is supported on the basic housing member so as to be pivotable about an axis. When the cover is removed, the filter element can be inserted into the interior of the filter housing or removed therefrom. The filter element is framed by a frame on which a sealing element is arranged that is resting in the interior of the housing in a seal-tight position against an inner housing wall in order to separate the raw (unfiltered) side from the clean (filtered) side of the filter element in a pressure-tight way.

This air filter is characterized by a simple exchangeability of the filter element. In order to counteract noise development that may be caused by vibrations of the housing and/or the filter element as a result of engine vibrations as well as pressure fluctuations of the motor when the air filter is installed in the intake manifold of the internal combustion engine, clamping measures in the form of additional fastenings elements may be provided by means of which the filter element is fixedly connected to the housing parts, for example, by means of a tie rod that penetrates the filter element. A disadvantage in this connection is however that for exchange of the filter element the fastening device must be released; however, as a result of tight space in the engine compartment, this is possible only when the entire filter housing is removed. This, however, constitutes a considerable mounting expenditure.

SUMMARY OF THE INVENTION

It is therefore an object of the present invention to configure with simple constructive measures a filter device for filtration of gaseous fluids in a way that it may be easily assembled wherein at the same time the filter element in the mounted state is to be clamped within the filter housing for the purpose of reducing vibrations.

In accordance with the present invention, this is achieved in that a connecting device penetrating the filter element is provided as a connection between the housing parts, wherein the connecting element comprises at least one housing projection that is formed monolithically on one housing part and further comprises a damping element that is arranged between the end face of the housing projection and the oppositely positioned other housing part.

The filter device according to the invention for filtration of gaseous fluids is in particular used as an intake air filter in the intake manifold of internal combustion engines for filtration of combustion air to be supplied to the cylinders of the internal combustion engine. In principle, other applications in connection with the filtration of gases are also conceivable, for example, filtration of air that is to be supplied to the passenger compartment.

The filter device comprises a multi-part housing as well as a filter element insertable into the filter housing wherein in the mounted state the housing parts are connected to one another. According to the invention, a connecting device that penetrates the filter element is provided for connecting the housing parts wherein the connecting device has at least one housing projection that is formed as a monolithic or integral part of one of the housing parts. The connecting device also comprises a damping element that is arranged between the end face of the housing projection and the oppositely position housing part.

This embodiment enables a clamping action between the filter element and the housing parts wherein at least one housing part comprises a housing projection that is formed as a monolithic part of that housing part and projects into the filter element or penetrates it. Between the housing projection of the first housing part and the second housing part the damping element is arranged so that despite a pressure contact between the housing parts vibrations are strongly dampened. At the same time, the filter element is secured transversely to the longitudinal axis of the housing projection by means of the housing projection so that in the transverse direction the generation of noise-developing vibrations is also significantly reduced.

The housing projection that projects at least partially through the filter element is positioned advantageously only by pressure contact on the opposed housing part so that a simple releasable connection between the housing parts is provided that only transmits pressure forces by means of the intermediately positioned damping element but does not transmit tensile forces. This embodiment has the advantage that mounting as well as demounting of the filter element in the filter housing is possible by simple and fast measures and without requiring auxiliary tools. It is sufficient to insert the filter element in the prescribed position in the interior of the housing and to subsequently insert the housing part with housing projection and pass the housing projection formed thereon through the cutout in the filter element. Optionally, additional fastening elements for locking the housing parts on one another may be provided on the exterior of the filter housing, for example, clips that can be manually opened and closed. In this way, the housing parts are mutually pressure-loaded so that the housing projection penetrating the cutout in the filter element exerts pressure onto the intermediately positioned damping element and also onto the opposed housing part. By means of the thus resulting clamping action, the generation of vibrations is significantly reduced or inhibited.

On the other hand, demounting, i.e., removal of the filter element from the filter housing, is possible with simple measures because only the outer fastening devices must be released in order to remove the housing part provided with the housing projection from its mounting position. Since the housing projection simply contacts the damping element and/or the damping element simply contacts the oppositely positioned housing part, the first housing part that is provided with the housing projection or the opposite housing part can be removed without auxiliary means.

It can be expedient to form also on the second housing part a housing projection wherein the end faces of the two housing projections are facing one another and are aligned coaxially to one another and wherein the damping element is positioned between the end faces of the housing projections.

Optionally, it is expedient to connect the damping element with one of the housing parts, in particular, with a housing projection, for example, in such a way that into the end face of the housing projection a recess is introduced into which the damping element is insertable. In this way, a pre-assembled connection between housing projection and damping element is achieved; this simplifies assembly.

It is however also possible to introduce the damping element immediately into the cutout in the filter element and, subsequently, to contact the at least one housing projection with the damping element for assembling the filter device In case of two housing projections that in the mounted position are arranged end face to end face with intermediately positioned damping element, at least one of the housing projections projects into the cutout of the filter element wherein the second housing projection either also projects partly into the cutout or is located only in the vicinity of the exterior face of the filter element.

The damping element is preferably embodied as a damping plug or damping stopper and is comprised of a vibration-damping material, for example, polyurethane (PUR). In the embodiment as PUR foam, the sealing material can be cast into the recess. Injection-moldable sealing material may also be injection-molded onto the filter element. The embodiment as plug or stopper has the advantage that the damping element can be inserted, for example, immediately into the end face recess at the housing projection or into the cutout that is provided in the filter element and through which at least one housing projection extends at least partially.

The filter element has at least one cutout for realizing the clamping action by means of the housing projection. It may however be expedient to provide a plurality of spaced-apart cutouts in the filter element into which one or two housing projections project, respectively, in order to achieve across a larger surface area a clamping action between filter element and housing parts and, in this way, enhance the vibration reduction effect.

BRIEF DESCRIPTION OF THE DRAWING

Further advantages and expedient embodiments may be taken from the claims, the figure description, and the drawings.

DESCRIPTION OF THE PREFERRED EMBODIMENTS

Figure 1:
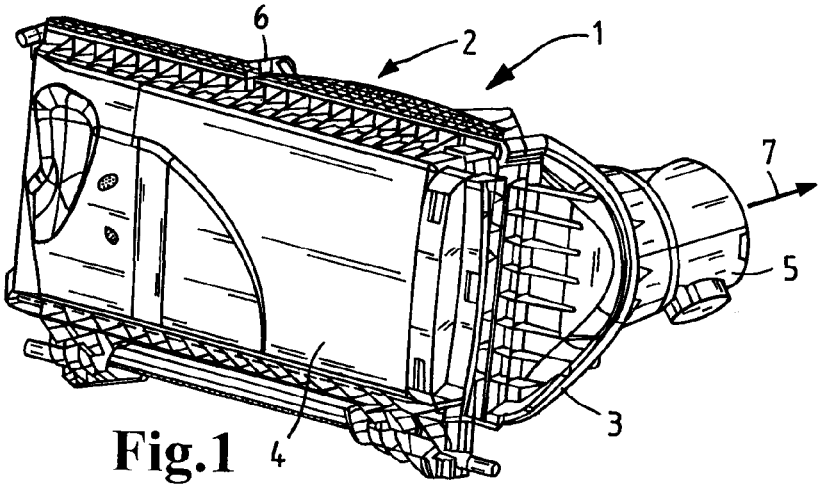
FIG. 1 shows a perspective view of a filter device for filtration of intake air in internal combustion engines with a multi-part filter housing for receiving a filter element.

In the Figures the same components are identified with same reference numerals.

As can be seen in FIG. 1, the filter device 1 for filtration of the intake air in internal combustion engines is comprised of a two-part filter housing 2 that is comprised of a housing part 3 at the clean air side and a housing part 4 at the raw (unfiltered) air side. In the interior of the filter housing 2, a filter element for filtration of the supplied combustion air is arranged. The housing part 3 at the clean air side is provided with an outlet socket 5 through which in the direction of arrow 7 the filtered intake air is supplied in the direction toward the cylinders of the internal combustion engine. For a detachable attachment of the two housing parts 3 and 4 on one another, fastening elements 6 are provided on the exterior of the filter housing; they are in particular manually secured and released.

Figure 2:
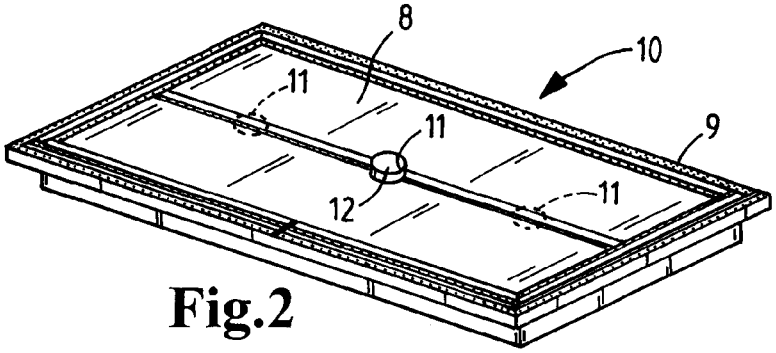
FIG. 2 shows in a perspective view a filter element with damping plug inserted into a cutout that is provided at the center of the filter element.

In FIG. 2 a filter element 8 is illustrated that is to be inserted into the filter housing 2 according to FIG. 1. The filter element 8 is of rectangular configuration wherein the faces form the raw side and clean side of the filter device, respectively. The filter element 8 is framed by frame 9 that may be a support for a circumferentially extending sealing element. The filter element 8 forms together with the frame 9 and the optionally circumferentially extending sealing element an exchangeable filter insert 10.

The frame 9 is not a required component; when it is not provided, the circumferentially extending sealing element that is, for example, comprised of PUR foam is directly cast or injection-molded onto the filter element.

At the center of the filter element 8, relative to the filter plane of the filter element that is orthogonal to the flow direction, there is a cutout 11 into which a plug-shaped damping element 12 is inserted. Optionally, the filter element 8 is provided with several cutouts 11 for receiving such damping elements 12 wherein the cutouts may be introduced in a symmetric or asymmetric arrangement into the filter element. The cutout 11 extends between the raw air side and the clean air side of the filter element. The damping element is comprised expediently of the same material as the sealing element surrounding the filter element, for example, PUR foam, and can be produced in the same process step as the circumferentially extending sealing element.

Figure 3:
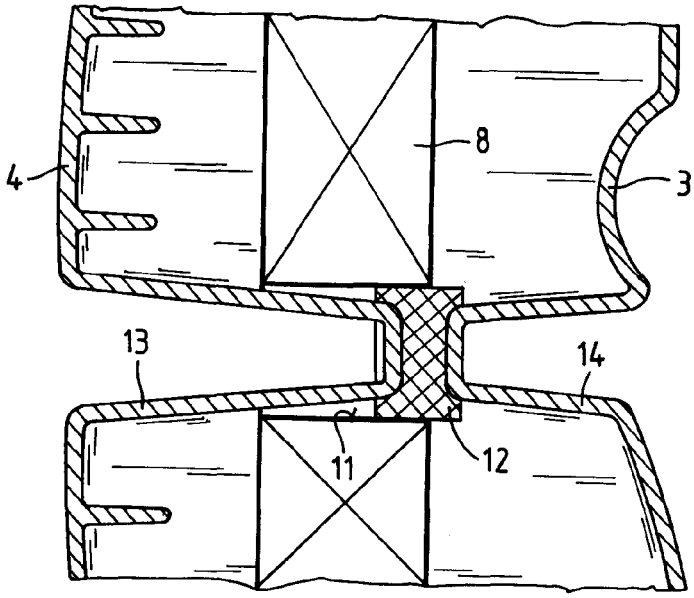
FIG. 3 is a sectioned detail view of the filter element with the two housing parts of the filter housing on which, respectively, a housing projection is formed, wherein one of the housing projections penetrates the cutout in the filter element and the damping element is arranged between the end faces of the coaxially arranged housing projections.

As can be seen in the section illustration of FIG. 3, on the inner side of each housing part 3, 4 a housing projection 13 and 14 is formed; the projections 13 and 14 are formed as a monolithic part of the respective housing part. A first housing projection 13 is located at the inner side of the housing part 4 at the raw air side and projects into the cutout 11 that is provided in the filter element 8. The second housing projection 14 is located at the inner side of the housing part 3 at the clean air side wherein in the mounted position according to FIG. 3 the two conically shaped housing projections 13 and 14 are aligned coaxially with one another and the end faces of the housing projections face one another. The second housing projections 14 on the housing part 3 of the clean air side is arranged immediately in the area of the external surface of the filter element 8 at the clean air side. Between the end faces of housing projection 13 and housing projection 14 the damping element 12 is inserted into the cutout 11.

In the mounted position by means of the fastening elements 6 (FIG. 1) the housing parts 3 and 4 are secured by a clamping force on one another that is oriented transversely to the plane of the filter element. This force is transmitted also by means of the two housing projections 13 and 14 and the intermediately positioned damping element 12 wherein the damping element 12 is resting only with loose contact on at least one of the immediately neighboring housing projections 13, 14 so that, when opening the external fastening elements 6, the housing parts 3, 4 can be removed from one another easily so that the filter element 8 is accessible and can be removed from the interior of the filter housing or can be inserted into the interior of the filter housing.

The filter element can be clamped by the damping element in interaction with the housing projections on one housing part so that upon opening of the filter housing; the filter element is released together with the housing part that is being removed; in this way, in particular in case of a mounting space that is difficult to access an element exchange is facilitated.

The filter element can be comprised of folded filter material, for example, filter paper. However, also other filter media or filter shapes may be expedient, for example, flat filter shapes of nonwoven material. In case of folded filter material, the housing projections are expediently designed such that the folds of the filter element are stabilized and, in this way, will not collapse, for example, in case of water introduction.

Figure 4:
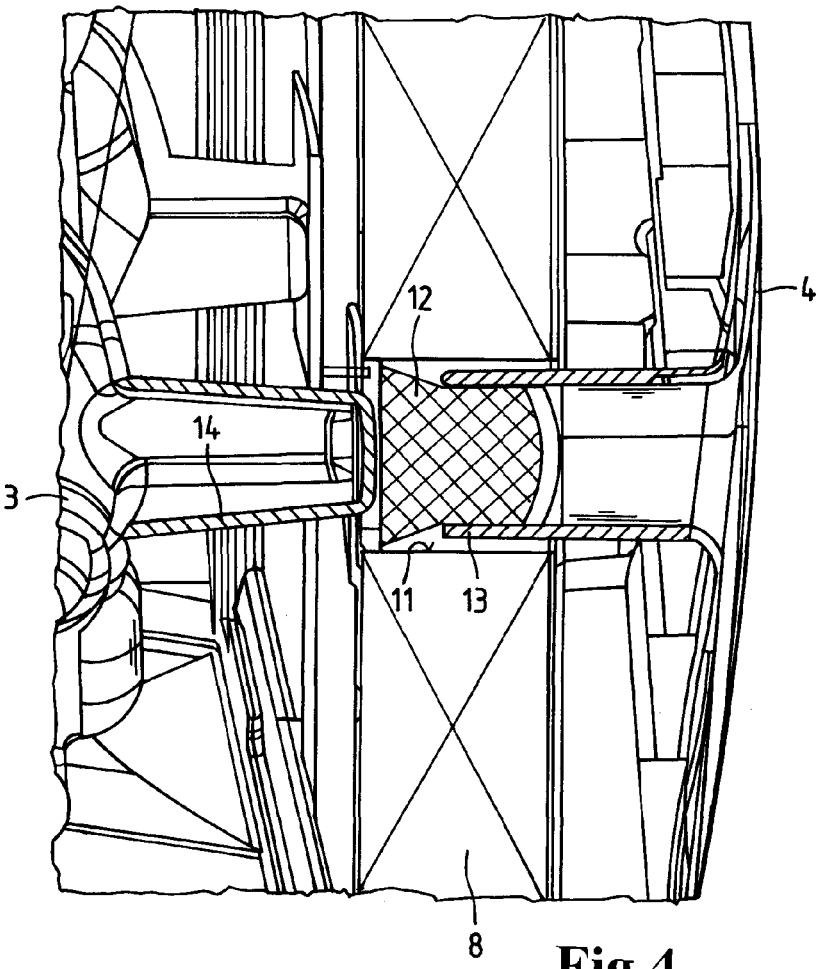
FIG. 4 shows a further section view of the filter device.

In FIG. 4 a detail section of the filter element 8 and of the housing parts 3 and 4 is illustrated. The housing projection 13 at the housing part 4 of the raw side of the filter device projects into the cutout 11 in the filter element 8. The end face of the projection 13 has a recess into which the plug-shaped damping element 12 is inserted. The damping element 12 is located completely within the cutout 11 in the filter element 8.

The second housing projection 14 on the housing part 3 of the clean air side contacts with its end face the damping element 12. In the mounted state the damping element 12 is forced by the end face of the housing projection 14 into its seat at the oppositely positioned housing projection 13. The end face of the housing projection 14 is positioned only loosely on the damping element 12 so that upon demounting the housing projections 13 and 14 can be separated from one another.

Figure 5:
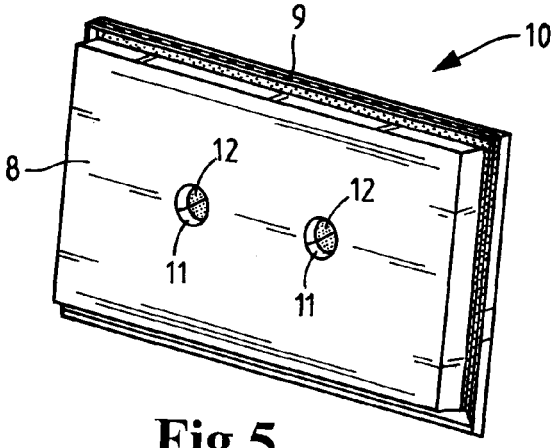
FIG. 5 is a further perspective view of a filter element in an alternative embodiment.

In FIG. 5, the filter element 8 is illustrated with a total of two spaced-part recesses 11 into which a plug-shaped damping element 12 is inserted, respectively.

The filter housing can be installed, for example, upright, i.e., the separation between the cover at the raw air side and the oppositely positioned housing part extends vertically. The cover at the raw air side in this case is pivoted away by means of a hinge after releasing the screws accessible at the topside. By means of the damping element that is clamped on the cover and is injection-molded on the filter element, the filter element will pivot outwardly with the cover and can thus be easily removed.

While specific embodiments of the invention have been shown and described in detail to illustrate the inventive principles, it will be understood that the invention may be embodied otherwise without departing from such principles.

What is claimed is:

1. A filter device for filtration of gaseous fluids, the filter device comprising:

a multi-part housing comprising a first housing part and a second housing part connected to one another in a mounted state of said multi-part housing;

a filter element insertable into said multi-part housing;

a connecting device penetrating said filter element and providing a connection between said first and second housing parts;

wherein said connecting device comprises at least one housing projection monolithically formed on said first housing part;

wherein said connecting device further comprises a damping element arranged intermediately between and contacting against said at least one housing projection and said second housing part;

wherein a simple releasable connection is provided between said housing parts that only transmits pressure forces by means of said intermediately arranged damping element but does not transmit tensile forces, wherein said releasable connection enables demounting of said filter element from said multi-part housing without requiring auxiliary tools.

2. The filter device according to claim 1, wherein said connecting device comprises a housing projection monolithically formed on said second housing part, wherein said housing projections on said first and said second housing parts each have an end face and said end faces are facing one another, wherein said damping element is arranged between said facing end faces of said housing projections.

3. The filter device according to claim 2, wherein each of said housing parts include a plurality of said housing projections.

4. The filter device according to claim 1, wherein said filter element includes at least one cutout into which a respective one of said at least one housing projection of said first housing part is inserted.

5. The filter device according to claim 4, wherein said damping element is arranged in said cutout of said filter element, wherein said filter element is clamped by said damping element between said first and second housing parts.

6. The filter device according to claim 1, wherein said damping element is embodied as a damping plug.

7. The filter device according to claim 1, wherein said damping element is resting loosely on said at least one housing projection of said first housing part and said second housing part.

8. The filter device according to claim 1, wherein an end face of said at least one housing projection of said first housing part has a recess extending into said at least one housing projection of said first housing part, wherein said damping element is received into said recess.

9. The filter device according to claim 1, wherein said damping element is comprised of polyurethane.

10. The filter device according to claim 1, wherein said at least one housing projection of said first housing part passes through a cutout provided in said filter element, said cutout oriented orthogonal relative to a filter plane of said filter element, wherein said filter plane is orthogonal to a flow direction through said filter element.

11. The filter device according to claim 2, wherein a plurality of said facing housing projection is provided.

12. The filter device according to claim 2, wherein said filter element includes at least one cutout into which a respective one of said at least one housing projection of said first housing part is inserted, wherein said damping element is arranged in said cutout of said filter element, wherein said filter element is clamped by said damping element between said first and second housing parts, wherein said damping element is embodied as a damping plug, wherein an end face of said at least one housing projection of said first housing part has a recess extending into said at least one housing projection of said first housing part, wherein said damping element is received into said recess, and wherein said damping element is comprised of polyurethane.

*13. An exchangeable filter element insertable into a filter housing for filtration of gaseous fluids, said filter element comprising:*

*a folded filter media extending along a filter plane orthogonal to a flow direction of said fluid;*

*wherein said folded filter media forms a first flow face and an orthogonally spaced second flow face,*

*said first flow face arranged at a raw side of said filter element and*

*said second flow face arranged at a clean side of said filter element;*

*wherein said folded filter media has outer sides extending between and connecting said first and second flow faces;*

*wherein said folded filter media includes at least one cutout extending through said folded filter media from said first flow face to said second flow face;*

*a dampening element formed of a vibration dampening sealing material, the dampening element arranged in the at least one cutout and connected onto the folded filter media, the dampening element closing the at least one cutout between the first flow face and the second flow face when in an uninstalled state of the filter element, the dampening element, in an installed state of the filter element, is clamped by a pressure contact of said housing onto opposing sides of said dampening element, reducing vibrations;*

*a sealing element secured to said filter media and extending circumferentially around said filter media along said outer sides, said sealing element operable for forming a seal between said filter element and said housing to sealably separate said raw side from said clean side.*

*14. The exchangeable filter element of claim 13, wherein a frame member encircles said filter media on said outer sides of said filter media;*

*wherein said frame member is secured onto said outer sides of said filter media;*

*wherein said sealing element is secured onto said frame member, said sealing element secured to said filter media through said frame member.*

*15. The exchangeable filter element of claim 14, wherein said frame member is arranged at and substantially parallel to one of said flow faces.*

*16. The exchangeable filter element of claim 13, wherein said at least one cutout is oriented orthogonal relative to said filter plane of said filter element.*

*17. The exchangeable filter element of claim 13, wherein said flow faces of said folded filter media are substantially rectangular.*

*18. The exchangeable filter element of claim 13, wherein said folded filter media comprises filter paper.*

*19. The exchangeable filter element of claim 13, wherein said folded filter media comprises a nonwoven filter material.*

*20. The exchangeable filter element of claim 13, wherein the vibration dampening sealing material of the dampening element is either cast directly into the at least one cutout or injection molded onto the folded filter media of the filter element.*

*21. The exchangeable filter element of claim 20, wherein the vibration dampening sealing material is the same material as the sealing element.*

*22. The exchangeable filter element of claim 20, wherein the vibration dampening sealing material is a polyurethane foam.*

* * * * *